United States Patent [19]

Wolf et al.

[11] 4,433,361
[45] Feb. 21, 1984

[54] COVER WITH ELECTRICALLY INSULATED CURRENT CONDUCTION

[76] Inventors: Franz-Josef Wolf, Sprudelallee 19, D-6483 Bad Soden-Salmuenster; Rudolf Klaschka, Tannenweg 9, D-7896 Wutoeschingen 3, both of Fed. Rep. of Germany

[21] Appl. No.: 285,128
[22] PCT Filed: Jan. 30, 1981
[86] PCT No.: PCT/EP81/00011
  § 371 Date: Jul. 15, 1981
  § 102(e) Date: Jul. 15, 1981
[87] PCT Pub. No.: WO81/02219
  PCT Pub. Date: Aug. 6, 1981

[30] Foreign Application Priority Data

Feb. 1, 1980 [DE] Fed. Rep. of Germany ....... 3003763

[51] Int. Cl.³ .................. H01G 9/00; H01M 2/08
[52] U.S. Cl. .................................. 361/433; 429/174; 429/175
[58] Field of Search ............. 361/433; 357/72; 429/174, 175

[56] References Cited

U.S. PATENT DOCUMENTS

| | | | |
|---|---|---|---|
| 2,039,154 | 4/1936 | Emmens et al. | 361/433 |
| 2,758,149 | 8/1956 | Brennan | 361/433 X |
| 3,061,660 | 10/1962 | Schenk, Jr. | 429/174 |
| 3,548,264 | 12/1970 | Carino et al. | 361/433 |
| 3,686,536 | 8/1972 | Pearce et al. | 361/433 |
| 4,074,417 | 2/1978 | Pearce et al. | 361/433 X |
| 4,122,243 | 10/1978 | Tsuchida et al. | 429/174 |
| 4,208,699 | 6/1980 | Philpott et al. | 361/433 |
| 4,230,754 | 10/1980 | Maher et al. | 357/72 X |

FOREIGN PATENT DOCUMENTS

| | | | |
|---|---|---|---|
| 107434 | 5/1939 | Australia | 361/433 |
| 662959 | 5/1963 | Canada | 361/433 |
| 948180 | 8/1956 | Fed. Rep. of Germany | 361/433 |
| 1950830 | 4/1970 | Fed. Rep. of Germany | 361/433 |
| 2255583 | 5/1974 | Fed. Rep. of Germany | 361/433 |
| 2388388 | 11/1978 | France | 361/433 |
| 570049 | 12/1957 | Italy | 361/433 |
| 45640 | 4/1939 | Netherlands | 361/433 |
| 725080 | 3/1955 | United Kingdom | 361/433 |

Primary Examiner—Andrew J. James
Assistant Examiner—Seth Nehrbass
Attorney, Agent, or Firm—Jordan and Hamburg

[57] ABSTRACT

A cover with an electrically insulated current lead-through for closing cup-shaped compartments of electrical components includes a lead-through element in the form of a lead-through disc having a lead-through post extending therefrom, a permeation-proof and electrical insulating material disposed over one side of the lead-through disc, and a cover plate disposed over the electrical insulating material such that the latter is sandwiched between the cover plate and the lead-through disc. The cover plate and insulation material have openings through which the lead-through post extends, the insulating material having an outer edge portion extending along the outer edge and partially onto the opposite side of the lead-through disc, the cover plate, the electrical insulating material and the lead-through element being mechanically secured together.

11 Claims, 4 Drawing Figures

COVER WITH ELECTRICALLY INSULATED CURRENT CONDUCTION

BACKGROUND OF THE INVENTION

The invention relates to a cover with electrically insulated current lead-throughs to close off cup-shaped or tube-shaped compartments of electric components, especially to close the compartments of condensers.

The invention relates in particular to a cover which consists of several layers which form a composite structure which are tightly interconnected with each other. In such a cover, an electricity-conducting lead-through disc having a lead-through element is connected with a ridged cover plate, which may be of metal or artificial material, in such a way that the lead-through element traverses an opening in the cover plate. A tightly insulated disc, or layer impermeable to gases and fluids and electrically insulated is inserted between the cover and the lead-through disc.

There has been made increasing use of lids or cover plates for locking tube-shaped or cup-shaped compartments of electric or electronic components, especially for locking the cup-compartments of electric condensers which consist of a metallic material, especially aluminum. Such covers have shown to have a high temperature consistency and at the same time a high shut-out effect against the permeation of gases and vapors.

If, despite these advantages, aluminum covers have but hesitatingly found their way into the market, the reason may be found in that such covers up to now could only imperfectly be provided with electrically insulating and permeation-proof current lead-through passages.

Cover plates of this type have, for instance, been made known by the publication of Federal Republic of Germany publication DE No. 27 38 747 A1, DE No. 26 09 061 A1 and DE No. 25 17 417 A1. A disadvantage in all these known current lead-through passages is the insufficient sealing between the electrical passage element and the cover plate forming the cover itself against the permeation of gases and fluid vapors. The creeping characteristics of fluids, especially as used in condensers, and the permeation characteristics of gases, especially those for oxygen which is very damaging to condensers, are such that in known locking covers, the path is so short that especially when operating at higher temperatures, an active substance exchange between the inside of the closed condenser and its environment may occur due to permeation and low sealing capacity of the sealing of the lead-through elements.

The invention has an object to provide a locking cover for locking the compartments of cup-shaped or tube-shaped electrical components, especially for locking condenser compartments, which, however even at high temperatures, especially temperatures over 120° C., will produce a long-term stable and reliable locking cover with substantially improved impermeability and sealing of gases and vapors.

SUMMARY OF THE INVENTION

To attain this objective, the invention provides for a locking cover of the above-described type, which is characterized by the following three features:

(a) an electric lead-through element is formed in one piece with a disc and may either be formed with the disc or formed onto the disc with such lead-through disc having at least the same diameter or a slightly smaller diameter than the cover plate itself;

(b) an electrically insulated disc or layer is sandwiched between the cover plate and the lead-through disc in a form such that it preferably extends around the outer edge of the lead-through disc on the oppositely lying upper side which, when the tube compartment or cup compartment is closed faces the outside, preferably forming a ring around the lead-through disc; and (c) the cover plate is electrically insulated, being, however, at the same time mechanically rigidly connected with the lead-through disc.

The mechanical connection of the three components, e.g. the lead-through disc, the electrically insulated intermediate layer or intermediate disc and the cover plate itself (in relation to the compartment inside) may be accomplished by glueing, welding, clamping, locking engagement or bolting down in a known manner. If, for instance, the cover plate consists of artificial material, such plate of artificial material is preferably supported on the electric lead-through of the lead-through disc, for instance through bolting, by clips, threading, bayonet locking or other forms of indentation fitting. If, however, the cover plate is of metal or other easily deformable material, to start with, the same may be formed with a clearly larger diameter than the lead-through disc, wherein then the transcending protruding outer edge area of the cover plate is seamed upwardly and inwardly onto the upper face of the lead-through disc. If electricity-conducting substances are used for manufacturing the cover plate, attention should, of course, be given that the seamed edges of the cover plate catch into the transcending protruding electrically insulated areas of the intermediate layer without touching the lead-through disc itself since otherwise the, electrical insulation of the current lead-through would no longer exist.

Such seam should preferably be kept as small as possible and especially be effected in such a way that the outer edge of the second disc catches sealingly from above into the ringed area of the electrically insulating intermediate layer onto the upper face of the first disc facing the outside, namely the lead-through disc. Herein the lid cover has an opening to allow the passage of the electrically insulated lead-through element, in the simplest case thus preferably with a smaller diameter. Since, however, this electrical lead-through element is formed in one piece with the lead-through disc which lies on the cover plate, in this form of construction of the locking cover practically the whole area of the locking cover will be subjected to creeping stretch and permeation. Accordingly, sealing tightness of the electrical lead-through elements can be achieved which up to now was not possible in any locking plate of known types. In a sealed cover plate such sealing tightness is additionally reinforced by ringed edge sealing which is formed by the outer edge of the seamed-in cover plate which grips onto the ring-formed edge area of the insulation layer. In addition, there are preferably formed on the lead-through disc, as also on the cover plate, protruding, self-contained sealing edge profiles which surround the current lead-through element, which profiles complimenting each other and preferably formed as ringed edge sealing, also grip into the electrically insulating intermediate layer.

The compartment locking cover constructed in this form with electrically insulated current lead-through elements is absolutely impermable to gases, vapors and liquids during operation at continuously high or very high temperatures. Through its sandwich-like construction, the cover is, besides, mechanically exceptionally strong so that, especially in view of its lead-through disc, in contrast to known locking covers with electrically insulated lead-through elements, it can be made thin and light-weight.

The electrically insulating intermediate layer between the two outer metal discs may consist of an elastic material as usually used for the sealing and locking of electrical components. Such substances may, above all, consist of butyl rubber mixtures and EPDM rubber mixtures. For locking plates, which are to withstand especially high temperatures, thus temperatures in a range of about over 120° C. up to a range of about 180° C., there is preferably employed in the manufacture of the electrically insulating intermediate layer a mineral construction material or a mixed construction material whose main ingredient is a mineral material. Herein the mineral construction materials may consist especially of glass-type sealing masses or mineral, fiber-type construction substances, which may be made impermeable by bonding agents resistant to high temperatures. Finally, the electrically insulating layer may also consist of artificial materials, especially of artificial materials which resist high temperatures, for instance of carbon polymers containing fluorine. For special purposes, the electrically insulating intermediate layer may also be formed as a laminate of different construction material.

A further advantage of the locking plate of this invention consists thus in that the sandwich-form construction makes it possible to select the sealing material from a substantially wider spectrum than for the known lead-through elements in view of the high requirements as concerns the sealing material.

Although the cover plate facing the inside of the compartment should be accessible to connection from the outside, there is provided on the lead-through disc, space-wise separated from the location of the lead-through element, which is connected with this disc, an additional opening through which a second electrically insulated lead-through element may be led that is connected with the cover plate, being formed from the latter or formed onto it. Electrical insulation of the lead-through against the metallic lead-through disc herein can be provided in a very simple way in that the diameter of the lead-through element connected with the cover plate is distinctly smaller than the diameter of the opening in the lead-through disc.

The lead-through elements are preferably formed as cup or dome-shaped recesses from the discs, that is from the lead-through disc as possibly also from the cover plate, especially through deep drawing. Herein the cup-shaped recesses on the one side, that is, the protruding dome-shaped or elevations on the other side may serve directly for receiving soldered connections. On the other hand, there may also be welded connection elements into the cup-shaped recesses, especially for instance, connection elements provided with connection threading. Especially when it is intended to weld connection threading into such cup-shaped recesses of the discs these recesses are preferably formed with a non-rounded cross-section in order to additionally ensure that the connection elements welded into the recesses do not displace themselves when the connections are screwed in.

The locking cover of this invention may, further, be ensured against excess pressure in the form of a burstable disc or burstable membrane, wherein the lead-through disc and the cover plate are provided with traversing openings, coaxially with each other, free passage through these coaxial openings being, however, tightly locked by the uninterrupted, electrically insulating intermediate layer. Herein also the openings formed in the lead-through disc and cover plate are provided with self-contained, surrounding, protruding sealing profile edges which, preferably in a complementary way towards each other, catch into the construction material of the electrically insulated intermediate layer. By this there is created also in the range of the burstable opening an edge sealing in addition to the surface sealing.

When it is intended to build-in the locking cover for it to be electrically insulated against the compartment of the electrical components, the outer edge of the connection cover, or better said the outer edge of the seamed-in cover plate, is provided with an electrically insulating layer. This may be an insulating layer tightly put onto the edge of the metal cover, for instance a thin layer of artificial material or a thicker layer of an elastic sealing material. Herein such sealing material may constitute a separate construction element or be affixed by vulcanization. Alternately, the cover plate may consist of an undeformable, electrically insulated artificial material. When such a cover plate of artificial material is affixed onto the lead-through element, especially by a tight secured catch or clip connection, the cover plate need not be led around the outer edge of the lead-through disc. Electrical insulation of the lead-through disc, in this embodiment of the locking plate, is safeguarded by the electrically insulating intermediate layer passed around the lead-through disc. Sealing of the outer edge of the locking cover in this embodiment of the locking cover against the compartment, in comparison with known locking covers, is thereby improved and especially mechanically stabilized, in that the cover plate of artificial material lies on the support base edge reinforcement in the compartment.

Especially when the locking cover of this invention is used for locking electrolyte condensers, preferably a form is used in which an electricity-conducting contact is provided between the cover edge, that is, the edge of the high-edged and seam-edged cover plate and the metallic cup compartment. Herein the compartment and the cover plate are usually switched as a minus-pole, while the electrically insulating lead-through element connected therewith are switched as a plus-pole. In this construction of the condenser, this type of application of the locking cover of the present invention, additional sealing of the bottom face of the locking cover is superfluous.

The invention is described in more detail by way of examples making reference to the drawings.

DESCRIPTION OF THE PREFERRED EMBODIMENTS

Figure 1:
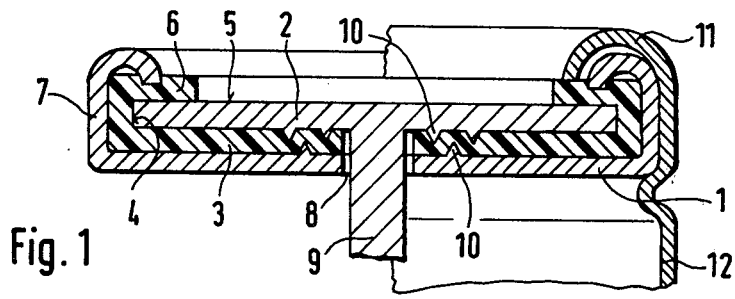
FIG. 1 is a schematic sectional representation of one embodiment of the cover.

FIG. 1 shows one embodiment of the closing cover of this invention. The cover consists of a cover plate 1, a lead-through disc 2 and an electrically insulating intermediate layer 3 which is sandwiched between the cover plate 1 and the lead-through disc 2. The intermediate layer 3 extends around and grips the outer edge 4 of lead-through disc 2 and passes around up to the oppositely lying outer surface 5 of the lead-through disc 2. The intermediate layer 3 forms a ring-shaped edge area 6 on the outer surface 5 of the lead-through disc 2. The outer edge 7 of the cover plate 1 extends over the outer edge 4 of the lead-through disc 2 and fits tightly around the outer edge 4 and the intermediate layer 3. The outer edge 7 is hemmed as it extends upwardly and grips from above, downwardly sealing onto the ring-shaped edge area 6 of the electrically insulating intermediate layer 3. The locking cover consists thus of a tight, sandwich-like composite of cover plate, lead-through disc 2 and intermediate layer 3.

In plate cover 1 there is provided a traverse opening 8 for a pin like lead-through element 9 which is formed in one piece with the lead-through disc 2. The diameter of the lead-through element 9 is sized sufficiently smaller than the diameter of opening 8 in cover plate 1 in order to make possible a faultless electrical insulation between the cover plate 1 and the lead-through element. To improve electrical insulation, the electrically insulating intermediate layer 3 may be drawn around the lead-through element 9 or extended down such that the intermediate layer 3 is also disposed between the inner edge of opening 8 of the cover plate 1 and the lead-through element 9.

In manufacturing the locking plate shown in FIG. 1, firstly the lead-through disc 2 containing the lead-through element 9 is coated or surrounded in the required manner, the cover plate 1 being then put on and, finally, the seaming is provided. When elastic materials are used for the intermediate layer 3, the rubber mixture is preferably sprayed directly around the lead-through disc and vulcanized in situ. Alternately, the rubber may also be vulcanized in the form of a disc with a protruding flanged edge onto the lower side of the lead-through disc 2 and subsequently, upon seaming of the cover plate 1, be folded with it. Alternately, there may also be used a casting process for manufacturing intermediate layer 3, wherein, preferably, the outer edge 7 of cover plate 1 is formed bowl-like with raised edges and the orifice between the lead-through element 9 and the inner edge of opening 8 in the cover plate 1 is selaed by secondary sealing. The clearance still remaining between the cover plate 1 and lead-through disc 2 is then sprayed directly with the material for the intermediate layer 3. This method is especially preferred when mineral construction materials are used. At this stage, the plate can be finished after seaming or folding the outer edge 7 of the cover plate 1 through sintering or melting and physical and/or a chemical new formation using a casting process.

To improve sealing in the area of opening 8, cover plate 1, as also lead-through disc 2, are provided with protruding complementary, self-contained ring-edge sealing profiles 10 which surround the opening 8 of the lead-through element 9.

Upon application in an electrolyte condenser, the cup edge 11 of the cup compartment 12 is preferably seamed around the outer edge 7 of cover plate 1 providing an electricity-conducting contact in a form such that the edge of the cup also catches into the ring-shaped edge area 6 of the electrically insulating material 3. This has the advantage that practically the entire effective lower face, that is the surface facing the inside of the locked condenser, has the same polarity as the compartment.

When electrical insulation is needed between the cover plate and the compartment 12, the outer edge 7 of cover plate 1 is coated or surrounded by electrically insulating material, wherein this material, preferably, is an electrically insulating elastic sealing material.

The representation shown in FIG. 1 of an embodiment of the invention is, as already noted several times, to be considered as a schematic representation. In practice the lead-through disc as also the cover plate are provided with additional protrusions and recesses for receiving additional sealing material to provide for higher compression of materials.

Figure 2:
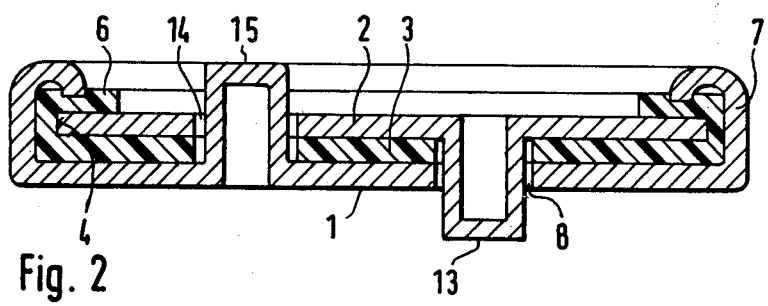
FIG. 2 is a schematic sectional representation of a second embodiment of the cover.

A second embodiment of the invention is represented in FIG. 2. Those parts which have the same function as in the example illustrated in FIG. 1 have been marked with the same reference numbers. The locking plate again consists of a sandwich-like construction, namely the cover plate 1, the lead-through disc 2 and the disc 3 of an electrically insulating material sandwiched between the two.

The lead-through element connected with the lead-through disc 2 is not formed as a pin element formed onto the disc, but is a cup or dome-shaped lead-through element 13 formed through deep drawing in one-piece from the lead-through element 13. The cup-shaped lead-through element 13 protrudes in the same manner as the pin-formed element 9 of FIG. 1 through an opening 8 in the cover plate into the inside of the condenser. In the representation of FIG. 2, the cup-shaped lead-through element 13 is accessible from above, thus from the outside of the locked condenser for establishing a soldered connection.

Again the outer diameter of the cup-shaped lead-through element 13 is smaller than the inner diameter of opening 8 in cover plate 1 so that the lead-through element 13, and therewith lead-through disc 2, are electrically insulated from the cover plate 1.

Further, the cover plate 2 has an opening 14 that is spatially separated from the lead-through element 13 which, as concerns its type and function, corresponds to opening 8 in the cover plate 1. Through this opening 14 there extends, without touching its edge, a dome-shaped protrusion 15, which is formed in one piece through deep-drawing from the cover plate 1. As for the other aspects, the dome-shaped protrusion 15 corresponds in form and function to the dome-shaped recess 13 in the lead-through disc 2.

The example of an embodiment of a metallic locking cover according to the present invention thus has two current lead-throughs which are insulated against each other in the form of cup or dome-shaped elements 13, 15, which have been drawn directly from plates 1, 2. Herein the lead-through disc 2 and the lead-through element 13, on the one hand, and the cover plate 1 and the lead-through element 15, on the other hand, are completely insulated from each other by the insertion of the electrically insulating material layer 3. Through the large active sealing surfaces, also the two plates are connected tightly with each other, being impermeable to gases and liquids. It is furthermore understood that the embodiment shown in FIG. 2 may be provided with the ringed sealing edges 10 shown in FIG. 1. In addition, the cover shown in FIG. 2 may also be used in the same way as described before in connection with the cover shown in FIG. 1.

Figure 3:
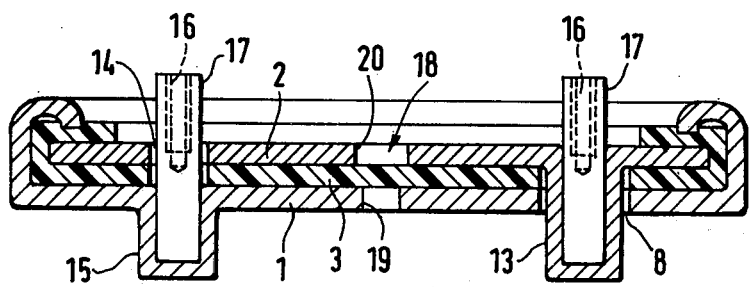
FIG. 3 is a schematic sectional representation of a third embodiment of the cover.

Finally, a third embodiment of the cover is represented in FIG. 3. Here again, the parts have been provided which have the same function and are marked with the same reference numbers.

The embodiment represented in FIG. 3 compares, in substance, with the embodiment illustrated in FIG. 2. The main difference is that through deep drawing the cup or dome-shaped element 15 formed from the cover plate 1 does not protrude outwardly in the figures, thus upwardly, but protrude to the inside of the condenser. The dome-shaped recesses which form the lead-through elements thus are formed in the cover plate 1 and the lead-through disc 2, protruding in the same direction, and thus are formed concave and respectively convex in the same direction. Herein, with reference to the cover of a composite structure illustrated in FIG. 3, the cup-shaped lead-through element 13 extends through the opening 8 in the cover plate 1, while the lead-through or connection element of cover plate 1 which is formed as a cup-shaped recess 15 does not traverse opening 14 in the lead-through disc 2. In the embodiment shown in FIG. 3, the connection element provided in the cup-shaped recess 15 traverses opening 14. In the simplest case this may be a connecting wire soldered in cup 15. In the embodiment shown in FIG. 3, the connections are costlier because the electric extension elements 17, which are provided with an inside thread, are welded inside the cup-shaped recess 13 as well as inside the cup-shaped recess 15. The advantage in this form of execution is that no special care has to be given to the thickness of the welding seam and that spot welding processes may be used since the lead-through elements themselves have been formed in one piece from covers 1 and 2.

The embodiment shown in FIG. 3 is further provided with an over-pressure safety device 18. The simplest form of an over-pressure safety device, represented in FIG. 3, is a burstable disc or burstable membrane. For this purpose an opening 19 is provided in cover plate 1 and an opening 20 in lead-through disc 2. The openings are arranged coaxially to each other. The passage formed by the two coaxially arranged openings through the cover is hermetically sealed by the impermeable intermediate layer 3, wherein this area of the intermediate layer 3 acts as a burstable disc or burstable membrane. The arrangement and the diameter of openings 19, 20 is selected so as to correspond to the type of material for the electrically insulating intermediate layer as well as to its thickness and the predetermined bursting pressure. The diameters of openings 19, 20 as shown in FIG. 3 may be the same, but they may also differ, wherein either the diameter of opening 20 or opening 19 may be larger. Since, however, the material of the electrically insulating layer or disc should be as little as possible in contact with the mostly fluid substance inside the compartment, namely the electrolyte or insulating liquid, opening 19 of the bursting overpressure valve is preferably kept as small as possible, as a rule thus smaller than opening 20. The burstable disc or membrane may, moreover, be covered by a weakened area on cover plate 1 on the inside of the cover plate, thus on the side of the cover facing the inside of the compartment according to official requirements.

Figure 4:
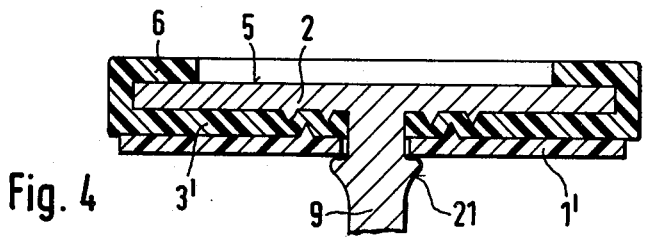
FIG. 4 is a schematic sectional representation of a fourth embodiment of the cover.

Finally, FIG. 4 shows a further embodiment of the locking plate whose essential elements correspond to those of the locking plate according to FIG. 1. In contrast to the example of FIG. 1, the cover plate 1' of the locking plate shown in FIG. 4 consists, however, of an electrically insulating material. The intermediate layer 3' consists of a rubber-elastic material which may also serve as a sealing material for the construction represented in FIG. 4, in which the compartment corresponding to 11 and 12 in FIG. 1 is not shown. On the pin-shaped lead-through element 9, there is provided a reinforcement 21 which acts as a catch or locking element and which, on assembly of the locking plate and the cover plate from artificial material 1', forms a resistance against the rubber-elastic deformable intermediate layer 3'. Also the locking plate shown in FIG. 4 forms a uniformly stable composite structure in which the lead-through disc 2 with which the pin-formed lead-through element 9 is formed in one piece is made of aluminum.

We claim:

1. A cover with electrically insulated current lead-through for closing cup-shaped compartments of electrical components, comprising a lead-through element in the form of a lead-through disc having a lead-through post extending therefrom, said lead-through post being integrally formed with said lead-through disc, a permeation-proof and electrical insulating material disposed over a first side of said lead-through disc, a cover plate disposed over said permeation-proof and electrical insulating material such that the latter is disposed between said cover plate and said lead-through disc, said cover plate and said permeation-proof and electrical insulating material having openings through which said lead-through post extends, said opening in said permeation-proof and electrical insulating material and said opening in said cover plate being of substantially the same size and configuration as that of said lead-through post, said cover plate having an outer diameter substantially extending at least to the outer diameter of said lead-through disc, said permeation-proof and electrical insulating material having an outer edge portion extending around the outer edge and partially onto a second side, opposite said first side, of said lead-through disc, and connecting means mechanically securing said cover plate, said permeation-proof and electrical insulating material and said lead-through element together to thereby provide a sandwich construction arrangement consisting of said lead-through disc, said permeation-proof and electrical insulating material, and said cover plate with the aforesaid sandwich construction extending substantially from said lead-through post to the outer diameter of said lead-through disc to provide enhanced sealing of gases and vapors.

2. A cover according to claim 1 wherein said cover plate is made of an electrically insulating artificial material, said connecting means comprising a protrusion means on said lead-through post which bears against said cover plate to thereby retain said cover plate in a desired position relative to said lead-through disc such that said permeation-proof and electrical insulating material is thereby lockingly secured between said cover plate and said lead-through disc.

3. A cover according to claim 1 wherein said cover plate is made of a metal, said cover plate having an outer edge section extending around said outer edge portion of said permeation-proof and electrical insulating material, said outer edge section having a terminating edge terminating against the permeation-proof and electrical insulating material which is disposed on said second side of said lead-through disc.

4. A cover according to claim 1 wherein said lead-through post is formed as a solid pin.

5. A cover according to claim 1 wherein said lead-through post is formed as a hollow cup-shaped element having a hollow recess.

6. A cover according to claim 5 wherein said cup-shaped element is adapted to receive an electrical connection which is secured in the hollow recess of said cup-shaped element.

7. A cover according to claim 1 wherein said permeation-proof and electrical insulating material is made substantially of a mineral material.

8. A cover according to claim 1 wherein said cover plate and said permeation-proof and electrical insulating material have a mating groove, and an indentation disposed around said lead-through post to effect a tight gripping action between said cover plate and said permeation-proof and electrical insulating material.

9. A cover according to claim 1 wherein said lead-through disc and said insulating material have a mating groove, and an indentation disposed around said lead-through post to effect a tight gripping action between said lead-through disc and said permeation-proof and electrical insulating material.

10. A cover with electrically insulated current lead-through for closing cup-shaped compartments of electrical components, comprising a lead-through element in the form of a lead-through disc having a lead-through post extending therefrom, said lead-through disc having means defining an opening spaced from said lead-through post, a permeation-proof and electrical insulating material disposed over a first side of said lead-through disc, a cover plate disposed over said permeation-proof and electrical insulating material such that the latter is sandwiched between said cover plate and said lead-through disc, said cover plate and said insulation material having openings through which said lead-through post passing through said opening in said lead-through disc, said insulating material having an outer edge portion extending along the outer edge and partially onto a second side, opposite said first side, of said lead-through disc, and means mechanically securing said cover plate, said permeation-proof and electrical insulating material and said lead-through element together.

11. A cover according to claim 10 wherein said second lead-through post is integrally formed with said cover plate.

* * * * *